United States Patent [19]

Komatsu

[11] Patent Number: 5,400,108
[45] Date of Patent: Mar. 21, 1995

[54] AUTOFOCUS MODULE ASSEMBLY

[75] Inventor: Sachiaki Komatsu, Kanagawa, Japan

[73] Assignee: Fuji Electric Co., Ltd., Kanagawa, Japan

[21] Appl. No.: 70,830

[22] Filed: Jun. 3, 1993

[30] Foreign Application Priority Data

Jun. 4, 1992 [JP] Japan .................... 4-143054

[51] Int. Cl.$^6$ ............... G03B 13/18; G03B 17/02; G01J 1/20
[52] U.S. Cl. ................. 354/402; 354/288; 354/406; 250/201.8
[58] Field of Search ............ 354/402, 162, 163, 288, 354/406, 408; 358/55; 250/201.8

[56] References Cited

U.S. PATENT DOCUMENTS

| | | | |
|---|---|---|---|
| 4,341,448 | 7/1982 | Toyoda et al. | 354/288 |
| 4,523,102 | 6/1985 | Kazufumi et al. | 250/201.8 |
| 4,622,580 | 11/1986 | Levine | 358/55 |
| 4,808,808 | 2/1989 | Karasaki et al. | 354/408 X |
| 4,959,677 | 9/1990 | Suda et al. | 354/402 |
| 5,258,804 | 11/1993 | Suda | 354/402 X |
| 5,294,805 | 3/1994 | Izraelev | 250/201.8 |

*Primary Examiner*—Michael L. Gellner
*Assistant Examiner*—Jae N. Noh
*Attorney, Agent, or Firm*—Finnegan, Henderson, Farabow, Garrett & Dunner

[57] ABSTRACT

A pair of separator lenses are attached to the top surface of a light-shield box. A leg portion having bifurcate legs and made of a transparent resin protrudes at each of the two sides of the bottom surface of the light-shield box. The leg portions are bonded to a package of an autofocus IC with an ultraviolet-curing-type adhesive.

5 Claims, 2 Drawing Sheets

AUTOFOCUS MODULE ASSEMBLY

BACKGROUND OF THE INVENTION

The present invention relates to an assembly of a passive-type autofocus module that is incorporated in an autofocus camera.

As is well known, recent autofocus cameras have a passive-type autofocus module which measures a distance to an object by forming its image on a one-dimensional image sensor and processing a resulting image signal.

FIGS. 4(a) and 4(b) show a conventional autofocus module assembly, in which reference numeral 1 represents an autofocus IC; 2, a pair of separator lenses arranged side by side; and 3, a light-shield box. The autofocus IC 1 is formed by sealing an IC chip 1a in a mold package 1b made of a transparent resin. Leads 1c are laterally extended from the mold package 1b.

To assemble the above module, first the lenses 2 are attached to the top surface of the light-shield box 3, which is then mounted on the package 1b at a predetermined position. Then, an ultraviolet-curing-type adhesive 4 applied between the package 1b and each of bifurcate leg portions 3a protruded at the two sides of the bottom surface of the light-shield box 3 is illuminated with ultraviolet light from a position laterally spaced from the light-shield box 3. As a result, the adhesive 4 sets to bond the leg portion 3a to the package 1b. By virtue of the use of the ultraviolet-curing-type adhesive 4, mere illumination by ultraviolet light accelerates the setting reaction to provide a short setting time without necessitating a heat treatment, which might adversely affect the autofocus IC 1.

However, the following problems occur in setting the ultraviolet-curing-type adhesive 4 applied between the light-shield box 3 and the package 1b of the autofocus IC 1 by illuminating it with ultraviolet light.

Since the conventional light-shield box 3 is made of an opaque resin, when ultraviolet light is emitted from light sources provided near the light-shield box 3 (on both sides of a conveyer in an actual production line), part of the light is blocked by the bottom face and the back face of the leg portion 3a and does not reach the adhesive 4, to produce non-set portions, which may cause a bonding defect. To avoid this problem, in the conventional assembling process, an additional light source is provided so as to illuminate the adhesive 4 in a different direction, i.e., toward the back face of the leg portion 3a of the light-shield box 3. However, in an actual production line, it is difficult to do so because a conveyer, various jigs, etc. may act as obstacles. Further, the increase of the number of light sources results in an increase of power consumption.

SUMMARY OF THE INVENTION

The present invention has been made in consideration of the above problems in the art and, therefore, an object of the invention is to provide an autofocus module assembly in which the setting reaction in adhesives applied between a light-shield box and an autofocus IC package can effectively be accelerated without leaving any non-set portions by illuminating those with ultraviolet light from the outside of the light-shield box.

According to the invention, an autofocus module assembly comprises:

a light-shield box comprising at least one leg portion made of a transparent resin;

a separator lens system provided on one side of the light-shield box; and an autofocus IC comprising a package and provided on the other side of the light-shield box, the package being bonded to the leg portion of the light-shield box with an ultraviolet-curing-type adhesive.

According to another aspect of the invention, an autofocus module assembly comprises:

a light-shield box comprising at least one leg portion having bifurcate legs different in length and generally arranged in an inside-outside direction of the light-shield box;

a separator lens system provided on one side of the other side of the light-shield box; and an autofocus IC comprising a package having a step portion and provided on the other side of the light-shield box, the step portion of the package being bonded to the leg portion of the light-shield box with an ultraviolet-curing-type adhesive such that the step portion conforms to the bifurcate legs.

DESCRIPTION OF THE PREFERRED EMBODIMENTS

Embodiments of the present invention are described hereinafter with reference to the accompanying drawings.

Embodiment 1

Figure 1:
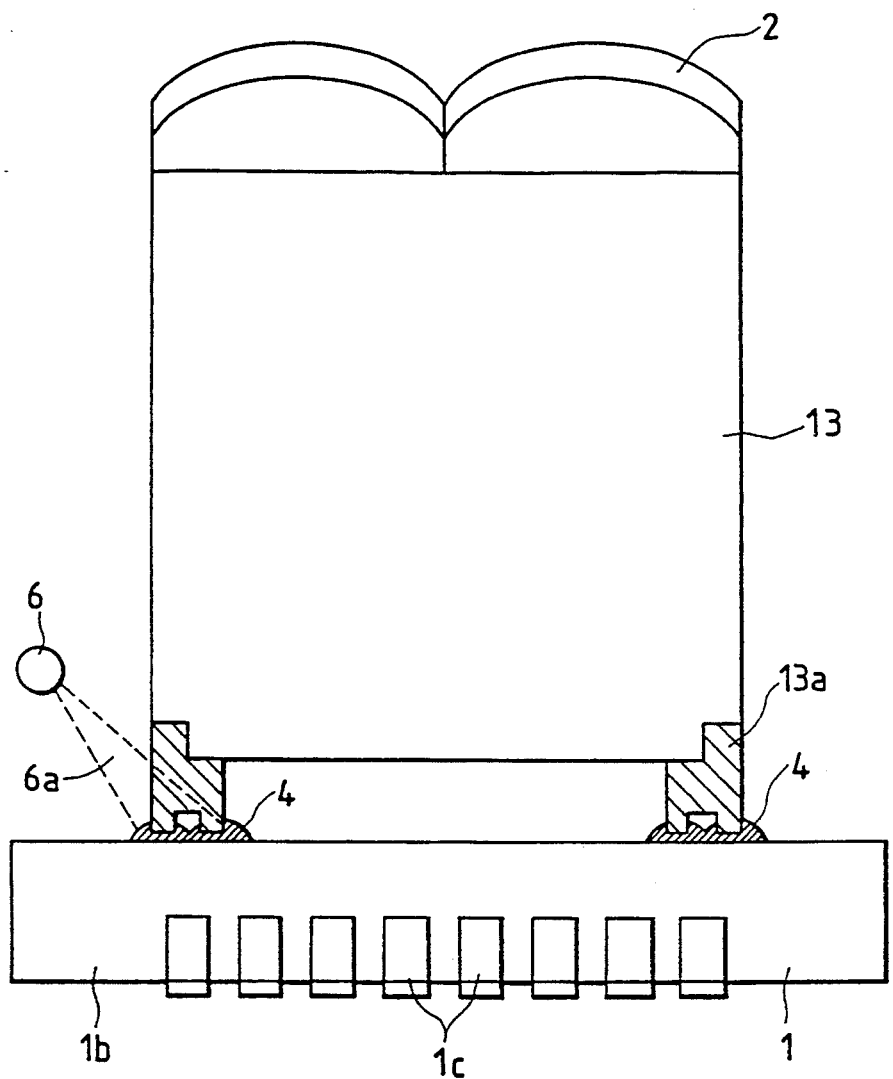
FIG. 1 a front view of an autofocus module assembly according to a first embodiment of the present invention.

FIG. 1 shows an autofocus module assembly according to a first embodiment of the invention. Transparent resin leg portions 13a, which are prepared as separate parts, are bonded to the bottom surface of the main body of a light-shield box 13. Further, the leg portions 13a are bonded to a package 1b of an autofocus module IC 1 with ultraviolet-curing-type adhesives 4. In a process of setting the adhesives 4, as shown in FIG. 1, ultraviolet light 6a is emitted toward the bonding portion from a light source 6 that is provided at a lateral position outside of the light-shield box 13. Since part of the light 6a passes through the leg portion 13a to reach the portions of the adhesive 4 that are in contact with the bottom face and the back face of the leg portion 13a, the entire adhesive 4 is set without leaving any non-set portions, to assure positive bonding between the leg portion 13a and the package 1b.

Embodiment 2

Figure 2:
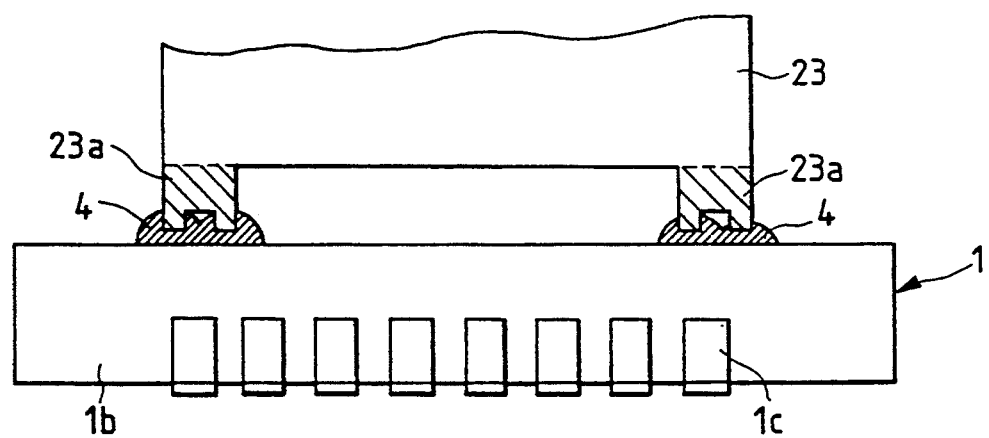
FIG. 2 is a front view of the main part of an autofocus module assembly according to a second embodiment of the invention.

FIG. 2 shows an autofocus module assembly according to a second embodiment of the invention. In contrast to the first embodiment in which the transparent resin leg portions 13a are prepared separately from the light-shield box 13 and bonded to the latter, in the second embodiment a light-shield box main body and transparent resin leg portions 23a are formed integrally at one time. A light-shield box 23 having the above structure is formed such that first a transparent resin is injected into cavities corresponding to the leg portions 23a of a mold for the light-shield box 23, and then an opaque resin is injected into the remaining portions of the mold.

In an actual use of the autofocus module after incorporated into a camera, since the leg portions 23a of the light-shield box 23 are covered with a casing and thereby shielded from ambient light, there is no possibility that the transparent leg portions 23a cause any problem in operation.

Embodiment 3

Figure 3A:
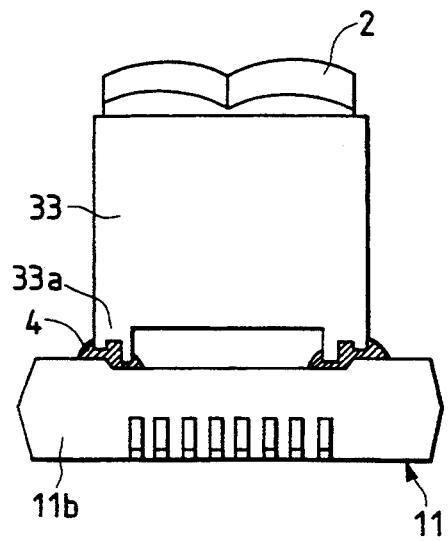
FIG. 3(a) is a front view of an autofocus module assembly according to a third embodiment of the invention.
Figure 3B:
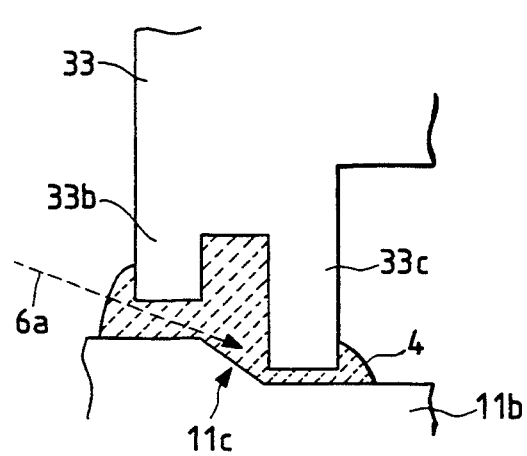
FIG. 3(b) an enlarged view of the main part of the autofocus module assembly of FIG. 3(a)
Figure 4A:
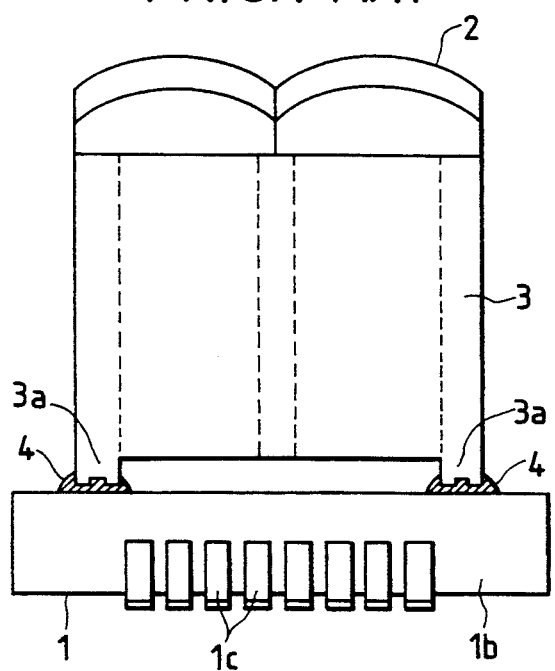
FIG. 4(a) is a front view of a conventional autofocus module assembly.
Figure 4B:
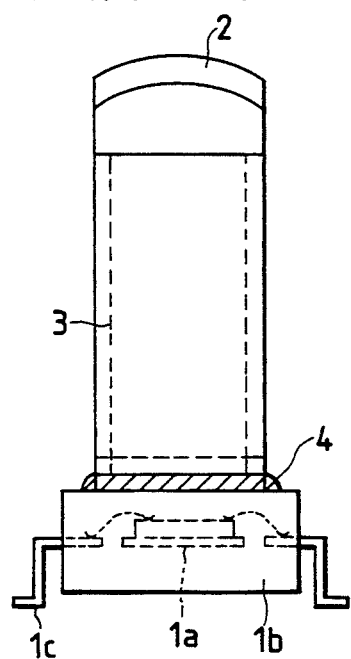
FIG. 4(b) is a side view of the autofocus module assembly of FIG. 4(a).

FIGS. 3(a) and 3(b) show an autofocus module assembly according to a third embodiment of the invention. In this embodiment, leg portions 33a each bifurcated into legs 33b and 33c having different lengths are protruded at the two sides of the bottom surface of the light-shield box 33. The inside leg 33c is longer than the outside leg 33b. The surface of an autofocus package 11b has a step portion 11c that conforms to the legs 33b and 33c having different lengths.

In a process of mounting the light-shield box 33 on the package 11b, first the positioning is performed so that the legs 33b and 33c of the leg portion 33b are opposed to the higher and lower levels, respectively, of the package 11b. In this state, in the same manner as in the first embodiment of FIG. 1, ultraviolet light 6a is emitted toward ultraviolet-curing-type resin 4 applied between the leg 33a and the package 11b from a light source provided at a lateral position outside of the light-shield box 33.

With the above structure, part of the light 6a passes through the portion of the adhesive 4 between the tip of the outside, shorter leg 33b and the higher level of the package 11b to reach the portion of the adhesive 4 around the longer leg 33c that is located above the lower level of the package 11b and inside of the leg 33b. As a result, the setting reaction in the adhesive 4 is accelerated with uniform illumination with the ultraviolet light 6a, so that the entire adhesive 4 is set without leaving any non-set portions, to assure strong bonding between the leg portions 33a of the light-shield box 33 and the package 11b. The existence of the step portion 11c contributes to the increase of the bonding strength.

As described above, according to the invention, the setting reaction in the ultraviolet-curing-type adhesive, which is applied between the light-shield box and the package of the autofocus IC, proceeds positively over the entire bonding area without leaving any non-set portions by inputting ultraviolet light to the adhesive only in one direction. As a result, the bonding portion between the light-shield box and the autofocus IC can be given sufficient bonding strength.

What is claimed is:

1. An autofocus module assembly comprising:
    a light-shield box comprising at least one leg portion made of a transparent resin;
    a separator lens system provided on one side of the light-shield box; and
    an autofocus IC comprising a package and provided on the other side of the light-shield box, the package being bonded to the leg portion of the light-shield box with an ultraviolet-curing-type adhesive.

2. The autofocus module assembly of claim 1, wherein the light-shield box is formed by bonding together the leg portion and a main body which are separately prepared.

3. The autofocus module assembly of claim 1, wherein the leg portion is an integral part of the light-shield box.

4. The autofocus module assembly of claim 1, wherein the leg portion has an inside leg positioned towards the interior of the light-shield box and an outside leg positioned towards the periphery of the light-shield box.

5. An autofocus module assembly comprising:
    a light-shield box comprising at least one bifurcated leg portion having an inside leg positioned towards the interior of the light-shield box and an outside leg positioned towards the periphery of the light-shield box, said inside leg being longer than said outside leg;
    a separator lens system provided on one side of the light-shield box; and
    an autofocus IC comprising a package having a step portion and provided on a side of the light-shield box opposite the separator lens system, the step portion of the package being bonded to the leg portion of the light-shield box with an ultraviolet-curing-type adhesive such that the step portion conforms to the inside and outside legs.

* * * * *